United States Patent
Evans et al.

(10) Patent No.: US 10,689,990 B2
(45) Date of Patent: Jun. 23, 2020

(54) VANE ARRANGEMENT FOR A GAS TURBINE ENGINE

(71) Applicant: ROLLS-ROYCE plc, London (GB)

(72) Inventors: Dale E. Evans, Derby (GB); Steven A. Radomski, Nottingham (GB); Clive Grafton-Reed, Leicester (GB)

(73) Assignee: ROLLS-ROYCE plc, London (GB)

( * ) Notice: Subject to any disclaimer, the term of this patent is extended or adjusted under 35 U.S.C. 154(b) by 148 days.

(21) Appl. No.: 15/969,167

(22) Filed: May 2, 2018

(65) Prior Publication Data
US 2018/0320534 A1 Nov. 8, 2018

(30) Foreign Application Priority Data
May 4, 2017 (GB) .................. 1707101.1

(51) Int. Cl.
| | | |
|---|---|---|
| *F01D 5/30* | (2006.01) | |
| *F01D 9/04* | (2006.01) | |
| *F01D 5/18* | (2006.01) | |
| *B23P 15/04* | (2006.01) | |
| *B23P 15/00* | (2006.01) | |
| *F01D 5/14* | (2006.01) | |

(52) U.S. Cl.
CPC .......... *F01D 5/3061* (2013.01); *B23P 15/006* (2013.01); *B23P 15/04* (2013.01); *F01D 5/147* (2013.01); *F01D 5/18* (2013.01); *F01D 9/041* (2013.01); *F01D 9/044* (2013.01); *F05D 2230/232* (2013.01); *F05D 2230/236* (2013.01); *F05D 2240/12* (2013.01); *F05D 2250/291* (2013.01)

(58) Field of Classification Search
CPC ........ F01D 9/044; F01D 5/3061; F01D 5/005; F01D 5/147; F01D 5/18; F01D 9/041; Y10T 29/49318; Y10T 29/49321; Y10T 29/49323; Y10T 29/49339; B23P 6/005; B23P 6/045; B23P 15/006; B23P 15/02–04; F05D 2230/232–236
See application file for complete search history.

(56) References Cited

U.S. PATENT DOCUMENTS

| | | |
|---|---|---|
| 3,166,295 A | 1/1965 | Szewalski et al. |
| 4,883,216 A | 11/1989 | Patsfall |

(Continued)

FOREIGN PATENT DOCUMENTS

| | | |
|---|---|---|
| CN | 204209295 | 3/2015 |
| EP | 0841470 | 5/1998 |

(Continued)

OTHER PUBLICATIONS

Translation of FR-3029238-B1 (Year: 2017).*

(Continued)

*Primary Examiner* — Matthew P Travers
(74) *Attorney, Agent, or Firm* — Oliff PLC

(57) ABSTRACT

A method of manufacturing a vane arrangement for a gas turbine engine comprises providing an aerofoil having a hollow cavity with an open end and providing a support member having a stub. The method further comprises welding the aerofoil to the stub. The method yet further comprises removing material from the stub so as to define a hollow region that extends through the support member and stub to the cavity of the aerofoil.

15 Claims, 5 Drawing Sheets

(56) References Cited

U.S. PATENT DOCUMENTS

| | | | |
|---|---|---|---|
| 4,944,444 A | 7/1990 | Renner | |
| 6,394,750 B1 | 5/2002 | Hiskes | |
| 6,438,838 B1 | 8/2002 | Meier et al. | |
| 7,025,568 B2 * | 4/2006 | Jones | F01D 5/16 29/889.72 |
| 7,544,040 B2 * | 6/2009 | Marke | F01D 9/06 29/889.22 |
| 2004/0060909 A1 | 4/2004 | D'Andrea et al. | |
| 2010/0054932 A1 | 3/2010 | Schiavo | |

FOREIGN PATENT DOCUMENTS

| | | | |
|---|---|---|---|
| EP | 1319802 | 6/2003 | |
| FR | 3029238 B1 * | 1/2017 | F01D 5/147 |
| GB | 807181 | 1/1959 | |
| JP | S62118973 | 5/1987 | |
| WO | 2014067868 | 5/2014 | |

OTHER PUBLICATIONS

Great Britain Search Report dated Oct. 30, 2017, issued in Great Britain Patent Application No. 1707101.0.

Great Britain Search Report dated Nov. 3, 2017, issued in GB Patent Application No. 1707103.6.

U.S. Appl. No. 15/969,1778, filed May 2, 2018 in the name of Evans, D.E. et al.

* cited by examiner

VANE ARRANGEMENT FOR A GAS TURBINE ENGINE

CROSS-REFERENCE TO RELATED APPLICATIONS

This specification is based upon and claims the benefit of priority from UK Patent Application Number 1707101.0 filed on 4 May 2017, the entire contents of which are incorporated herein by reference.

BACKGROUND

1. Field of the Disclosure

The present disclosure concerns a vane, for example a fan outlet guide vane, a gas turbine engine and/or a method of manufacturing a vane and/or gas turbine engine.

2. Description of the Related Art

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core. Airflow from the fan is split with most of the air being directed through a bypass duct and the remainder of the air being directed to the engine core.

Fan outlet guide vanes (OGVs) are provided in the bypass duct, and extend between a radially inner ring (e.g. a casing of the core) and a radially outer casing (e.g. a casing proximal to a nacelle of an engine). Conventionally, OGVs are load bearing. If structures such as A-frames are provided, the OGVs are arranged to transmit radial and axial loads from the outer casing to the inner casing, and the A-frames transmit the torsional loads and some radial loads. The A-frames may be used with an annular stiffening ring. The A-frames are provided downstream of the OGVs and together the OGVs and A-frames can be arranged to address pitch and yaw loading on the nacelle. If no additional structure is provided for transmission of torsional loads, the OGV can be arranged for transmission of axial, radial and torsional loads.

SUMMARY

According to a first aspect there is provided a method of manufacturing a vane arrangement for a gas turbine engine. The method comprises providing an aerofoil having a hollow cavity with an open end and providing a support member having a stub. The method comprises welding the aerofoil to the stub. The method further comprises removing material from the stub so as to define a hollow region that extends through the support member and stub to the cavity of the aerofoil.

The cavity of the aerofoil may comprise a leading edge and a trailing edge. The width of the cavity may be a minimum at the leading edge and trailing edge and a maximum at a position therebetween. The hollow region may comprise a leading and a trailing edge. The width of the hollow region may be a minimum at the leading edge and trailing edge. A smooth (e.g. linear or curved) transition may be provided between the cavity of the aerofoil and the stub such that the hollow region is free from steps.

The vane arrangement may be a stator vane arrangement. Alternatively, the vane arrangement may be a rotary vane arrangement.

The stub may be hollow with a cover extending across the stub at a position adjacent to where the aerofoil is welded to the stub.

The cover may include a protrusion that is received in the cavity of the aerofoil.

The protrusion may be used for locating the aerofoil relative to the stub.

The protrusion may have a perimeter that is a close fit within a leading edge and/or trailing edge of the cavity of the aerofoil.

The protrusion may be a close fit with the entire cavity.

The protrusion may be waisted so as to reduce the volume of material at a position distal from a weld formed between the stub and aerofoil.

The method may comprise removing material from the cavity of the aerofoil to define a radius greater than or equal to 3 mm at a leading edge and/or trailing edge of the cavity at a position adjacent to the open end of the cavity.

The stub may be hollow. The method may comprise forming a radius greater than or equal to 3 mm at the leading edge and/or trailing edge of the hollow portion of the stub at a position proximal to the aerofoil or where the aerofoil will be positioned once the arrangement has been welded.

The stub may comprise walls having a thicker region at a location proximal to a position of connection with the aerofoil. The thicker region may be tapered such that the thickness increases towards the position of connection with the aerofoil.

The walls of the aerofoil may be thicker in a region proximal to the open end than a region distal to the open end of the cavity.

The method may comprise providing an aerofoil with an enclosed cavity and removing one end of the aerofoil, e.g. by machining, to expose the cavity and define the open end of the cavity.

The method may comprise forming the aerofoil with enclosed cavity using diffusion bonding and hot creep forming.

The support member may be a ring.

The ring may be defined by a single annular member or a plurality of arcuate members. The plurality of arcuate members may be welded, or mechanically fastened (e.g. bolted) together or a combination of welding and mechanical fastening may be used to define the ring. For example, the ring may be made in segments of 2 or more vanes, and each of the segments may be welded or bolted together. Alternatively, single vanes and their associated support may be connected together.

The stub of the support may be welded to a radially inner end of the aerofoil.

The method may comprise providing a support foot having a stub, welding a radially outer end of the aerofoil to the stub of the foot; and removing material from the stub of the foot so as to define a hollow region that extends through the foot and stub to the aerofoil cavity.

The support member may be a support foot.

The support member (e.g. the support foot) may be mechanically fastened to a component e.g. a static member, of the gas turbine engine. For example, the support member may be bolted to a component of the gas turbine engine.

The vane arrangement may be a fan outlet guide vane arrangement.

In an aspect there is provided a method of manufacturing a vane arrangement. The method comprises providing a plurality of aerofoils, and providing a support member comprising a plurality of stubs. One of the aerofoils is connected to each of the stubs using the method according to the previous aspect.

In an aspect there is provided a method of manufacturing a gas turbine engine comprising the method according to any one of the previous aspects.

In an aspect there is provided a vane arrangement comprising a support member and a vane integral with the support member. Each vane comprises a cavity and the support member comprises a through hole. The through hole of the support member is aligned with the cavities of the vane so as to define a hollow region that extends from an open end of a surface of the support member to the cavity of the vane.

The vane arrangement may comprise a plurality of vanes integral with the support member. For example, the vane arrangement may comprise a support member; and a plurality of vanes integral with the support member; wherein each vane may comprise a cavity and the support member may comprise a plurality of through holes, the through holes of the support member being aligned with the cavities of the vanes so as to define hollow regions that extend from an open end of a surface of the support member to the cavity of the vanes.

The vane may be defined by an aerofoil.

The support member may be a ring and the open end of the hollow region may be provided on a radially inner surface of the ring.

The vanes may be welded to the support member.

The support member may comprise one or a plurality of stubs. One vane may be welded to each stub. The stubs may be hollow so as to form a portion of the hollow region.

The radius of the hollow region at the leading and/or trailing edge of the hollow region in a position proximal to the support member may be equal to or greater than 3 mm, for example, greater than or equal to 5 mm, or equal to or between 3 and 5 mm.

The radius of the cavity of the vane at the leading and/or trailing edge of the hollow region in a position proximal to the ring may be equal to or greater than 3 mm, for example, greater than or equal to 5 mm, or equal to or between 3 and 5 mm.

The walls of the vane may have increased thickness at a position proximal to the support member.

The vane arrangement may be a fan outlet guide vane arrangement.

The vanes may be load bearing structural vanes.

The arrangement may be manufactured using the method of the previous aspect.

In an aspect there is provided a gas turbine engine comprising the arrangement according to the previous aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
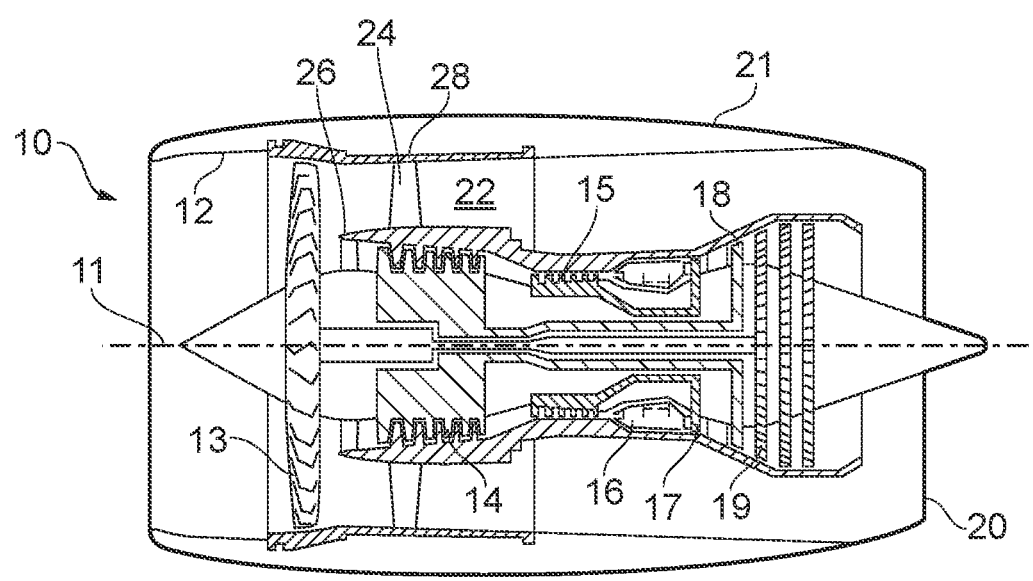
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Fan outlet guide vanes (OGVs) 24 are provided in the bypass duct 22. The OGVs guide airflow from the fan 13 through the bypass duct. The OGVs extend from an inner ring that connects to or forms part of the core casing/a splitter 26 that splits airflow from the fan between the bypass duct and the core. The OGVs are connected to an outer casing 28 of the bypass duct.

In the present example, the OGVs are arranged to transfer axial, radial and torsional loads. The OGVs are integrally formed with an inner ring and a hollow cavity is formed extending through the ring to a cavity of the OGV, such that the hollow cavity of the OGV and ring is open at a radially inner side of the ring. In this way, the aerofoil profile of the OGV can be greater (e.g. have a larger foot print), and/or the walls of the OGV can be thickened in a region proximal to the ring, so as to cope with the transfer of torsional loads, without the need for an A-frame structure. Provision of a hollow region extending through the ring to the OGV means the aerofoil can be made larger in regions proximal to the ring and/or the walls of the OGV can be thickened whilst having minimal weight and cost penalties. When the OGV is welded to the ring, the thickening of the walls of the OGV can improve the quality of the weld between the OGV and the ring.

Referring FIGS. 2A to 2D a method of manufacture of an OGV will now be described.

Figure 2A:
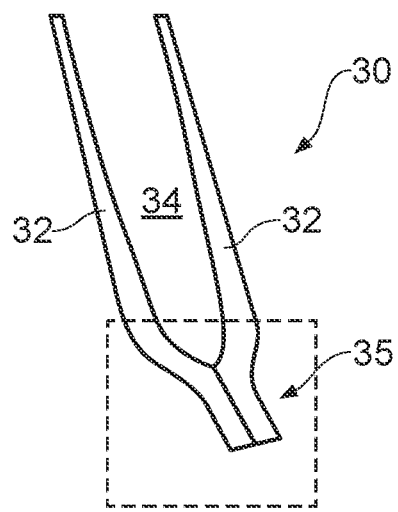
FIGS. 2A, 2B, 2C and 2D are schematic cross sections at different stages of manufacture of an outlet guide vane (OGV) arrangement.

Referring to FIG. 2A, in this example, an aerofoil 30 is made using two panels 32 that are diffusion bonded together and then hot creep formed to define a cavity 34. The ends 35 of the aerofoil are diffusion bonded such that the cavity 34 is enclosed.

Figure 3:
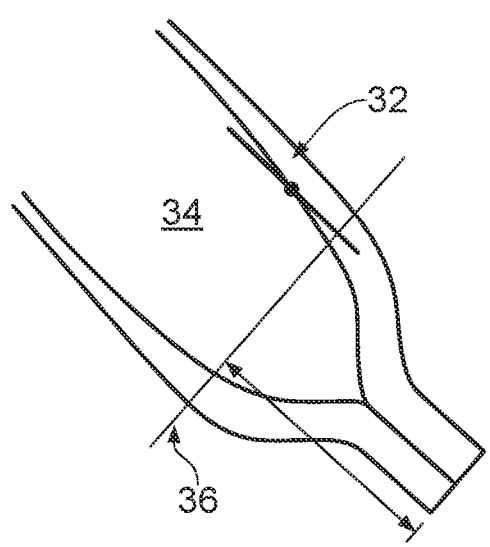
FIG. 3 is a transverse cross section of one end of an aerofoil with enclosed cavity.

Referring to FIG. 2A and FIG. 3, the panels 32 are tapered in thickness, such that the walls of the aerofoil have an increased thickness adjacent a position where the ends are diffusion bonded together. The tapering in thickness commences at a position spaced from the ends of the aerofoil, and more particularly spaced from a position 36 where the aerofoil will be subsequently trimmed to remove an end of the aerofoil. The spacing is such that the final trimmed aerofoil includes walls that have a thickness that increases in a taper towards a position of attachment with the ring. The tapering may be applied only in the regions of the leading and trailing edges, or may be applied across the entire cavity chord.

Figure 4:
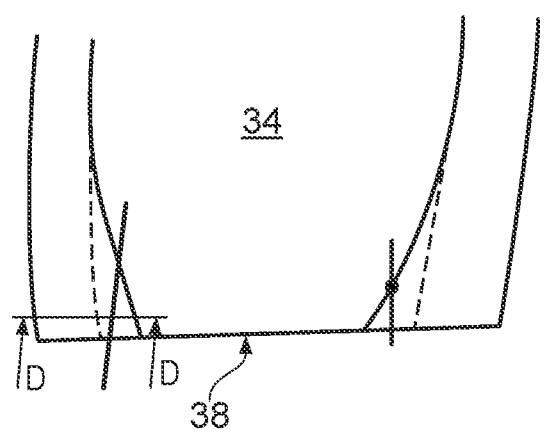
FIG. 4 is an axial cross section of one end of an aerofoil with a cavity open at one end.
Figure 5:
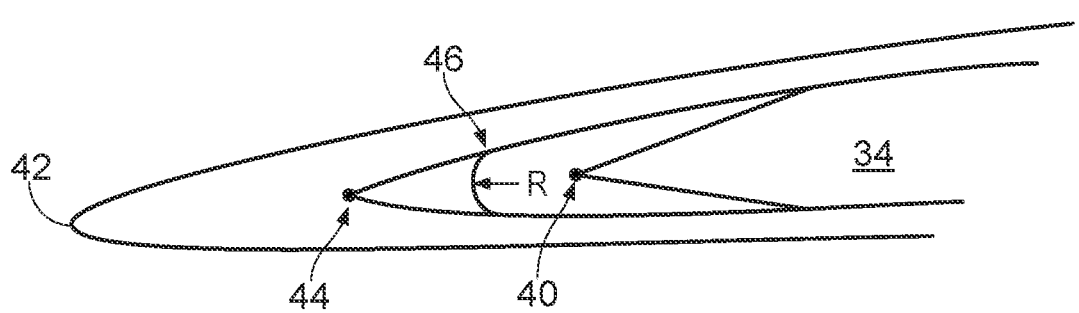
FIG. 5 is a radial cross section of a leading edge of an aerofoil taken at a section D-D of FIG. 4.

Once the aerofoil with enclosed cavity is formed, an end of the cavity is removed (at the line indicated at 36 in FIG. 3). The aerofoil is cut at a position sufficiently spaced from the end of the aerofoil that the cavity 34 is opened by the removal of the end. Further, the aerofoil is cut at a position before the walls of the aerofoil start to move closer together to form the closed end. Referring to FIG. 4, the walls of the aerofoil taper to have an increased thickness adjacent the open end 38 of the cavity 34. In this example, the increased thickness of the walls reduces the chord length of the cavity at a position proximal to the opening of the cavity compared to a position distal from the opening of the cavity. Referring to FIG. 5, it can be seen that the cavity 34 is shorter in chordal length compared to a cavity of a more conventional vane, with the leading edge 40 of the cavity 34 being spaced further from the leading edge 42 of the aerofoil, than a leading edge 44 of a cavity of a conventional vane, i.e. the leading edge portion of the aerofoil is thicker than a conventional vane. Although not illustrated, in the same way, the trailing edge portion of the aerofoil is thicker than a conventional vane.

Once the cavity 34 has been opened at a spanwise end of the aerofoil, the cavity is shaped (e.g. using a milling cutter) to increase the radius of a leading and trailing edge of the cavity 34. In the present example, the radius R is increased to approximately 3 to 5 mm. The radius of the leading edge and trailing edge of the cavity is increased in a region where the walls of the aerofoil taper to increase wall thickness; the added material provided by the thicker walls provides flexibility for selecting the desired radius. In the present example, the radius is increased in a portion of the tapered region proximal the cavity opening 38 (e.g. half of the tapered region has an increased radius). In this way, the cavity 34 of the aerofoil is still smaller in the region of the tapered portion of the walls, than a cavity of a conventional vane (the leading edge of the cavity at the increased radius portion is indicated at 46).

Figure 2B:
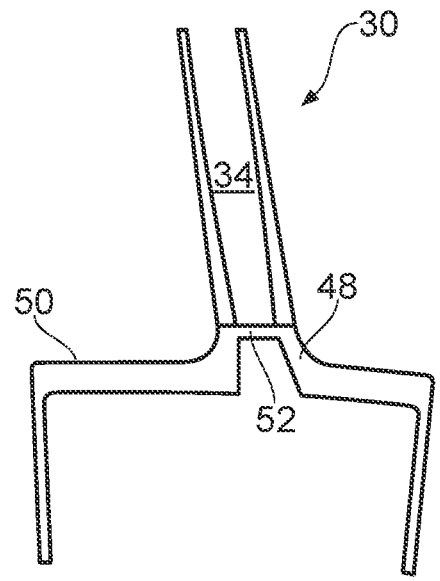
Figure 6:
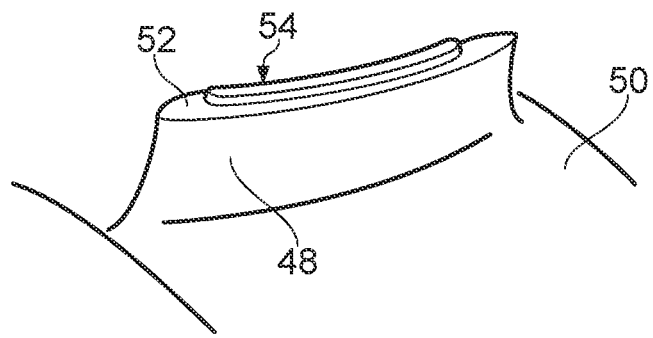
FIG. 6 is a perspective view of a ring with a stub.

Referring now to FIG. 2B and FIG. 6, the aerofoil 30 is positioned on a stub 48 of a ring 50. The ring may be connected to or may define a portion of a flow splitter (indicated at 26 in FIG. 1 and FIG. 7). The stub 48 is hollow and includes a cover 52 (the cover may also be referred to as a bridge or a cap). The cover 52 forms a bridge across the stub to enclose a radially outer end of the stub. A projection 54 extends from the cover. In the present example, the projection 54 is dimensioned and shaped to be a close fit to the open end of the cavity 34 of the aerofoil 30. The projection 54 locates the aerofoil relative to the stub. The aerofoil is then tack welded to the stub using methods known in the art.

Figure 2C:
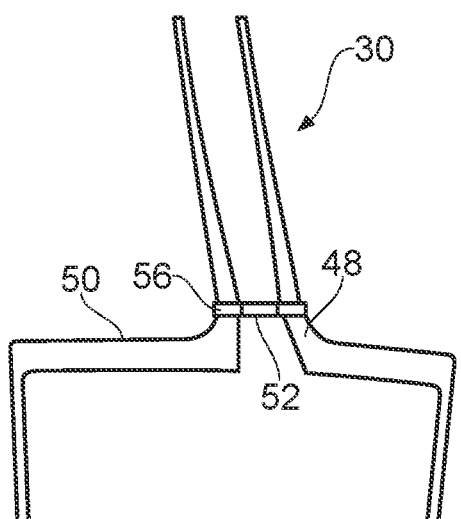

Referring now to FIG. 2C, once the aerofoil 30 is positioned and tacked it is welded to the stub 48, for example using electron beam welding or laser welding. A weld 56 is formed along the entire junction between the stub and the aerofoil. The projection 54 of the stub 48 prevents or reduces weld splatter on a wall of the aerofoil cavity. The minimum extent of the weld (in a width/thickness direction) is indicated by the weld 56 on the left of FIG. 8, and the maximum extent of the weld is indicated by the weld 56 on the right of FIG. 8.

Figure 2D:
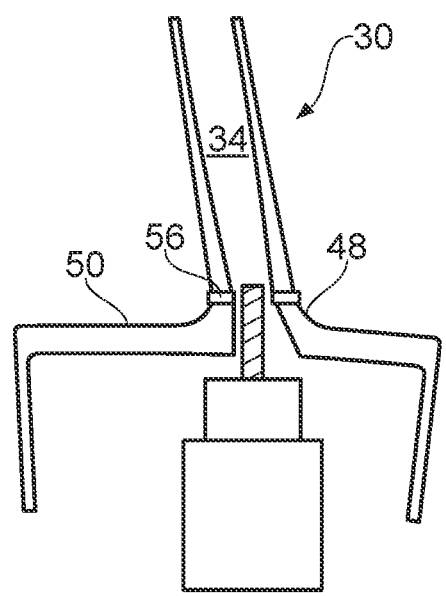
Figure 7:
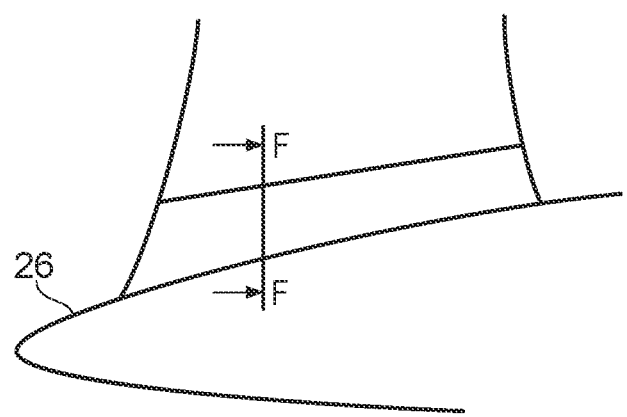
FIG. 7 is a side view of a splitter with an OGV connected.
Figure 8:
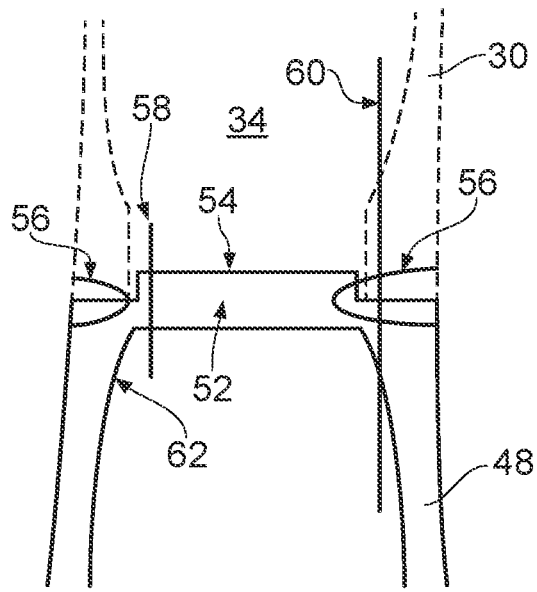
FIG. 8 is a transverse cross section through a joint between a stub and an aerofoil prior to a cover of the stub being removed and is taken at the section F-F of FIG. 7.

Referring now to FIGS. 2D, 7 and 8, once the aerofoil has been welded to the stub, at least a portion of the cover 52 and projection 54 is removed to define an open hollow region that extends from an open end at a radially inner surface of the ring 50 and/or stub 48 to the cavity 34 of the aerofoil 30. In the present example, the cover is removed using a machining method, e.g. a milling operation. In alternative embodiments any removal method may be used, for example a drill, saw or laser may be used. The cover may be removed at a position 58 adjacent the inner wall of the aerofoil and adjacent the weld, or it may be removed at a position 60 that is slightly inward of the inner wall such that a portion of the inner wall of the aerofoil is removed whilst still providing an aerofoil with increased wall thickness at a position proximal the stub 48. The tapering of the walls of the aerofoil and/or stub may be selected so as to provide additional material for this post-weld step. In the present example, the walls of the stub 48 have a taper 62 proximal to the cover and when material is removed up to position 60 a portion of the stub wall is also removed. In the present example, an increased wall thickness at the welded joint compared to the rest of the stub and/or aerofoil is maintained.

In alternative examples, the cover 52 may be removed up to a position 58 that is spaced inwardly of the inner surface of the wall of the aerofoil 30. In such an example, the remainder of the cover may be removed using a hand dressing technique, for example to remove potential stress raising features.

Figure 9:
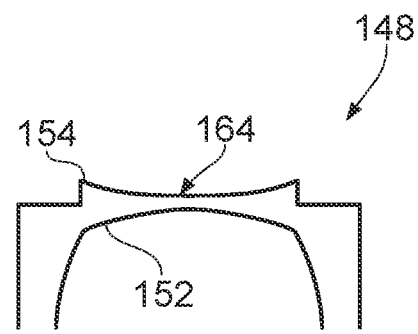
FIG. 9 is a cross section of an alternative stub.
Figure 10:
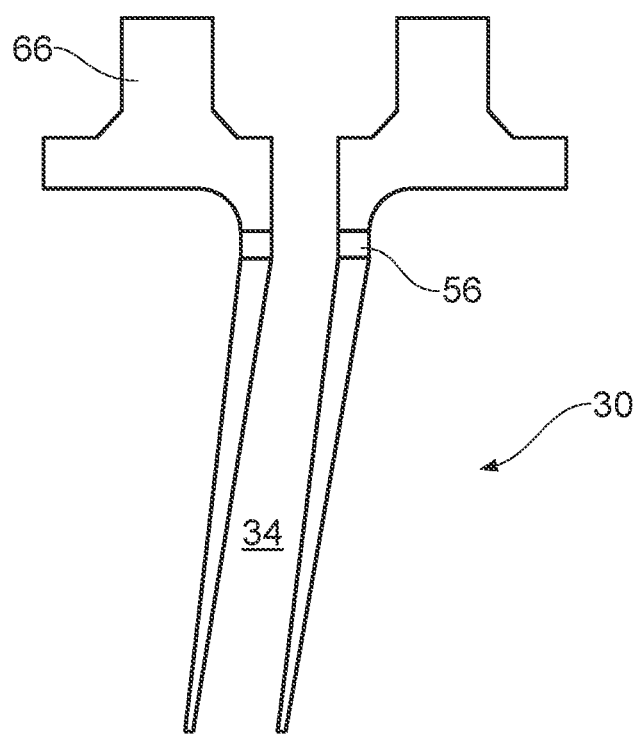
FIG. 10 is a cross section of an end of an aerofoil welded to a foot.

An alternative example of a cover is illustrated in FIG. 9. In this example the cover 152 and projection 154 define a waisted section. The waisted section is thinnest at a position distal to the position where the aerofoil will be welded to the stub 148. The dimensions of the waist may be selected such that it is largely consumed during the welding process. In such examples, post-weld processing (e.g. hand dressing) can be minimised.

In this example, a radially outer spanwise end of the OGV is connected to a foot 66 which can be bolted or otherwise connected to the outer casing, for example to a mounting ring. The aerofoil 30 may be connected to the foot in a similar manner to that previously described for connecting the inner spanwise end of the OGV to the stub of a ring. The foot may include a stub similar to that provided on the ring. As such, the radially outer spanwise end of the OGV may include a hollow cavity that extends through the foot to a cavity of the OGV. In this example, both ends of the cavity are open ended, so the cavity extends through the foot, OGV and ring.

The described method of connection permits the thickness of the wall of the aerofoil portion of the vane to be increased in a region proximal to joints with inner and/or outer ring members so as to better deal with transmittal of torsional loads. The provision of a hollow region extending through the ring and/or foot to the cavity of the aerofoil means that the weight penalty of having increased wall thickness can be reduced.

The provision of a projection on the cover aids in the manufacturing process because it aids location of the aerofoil on the stub and it prevents or reduces splatter onto the inner walls of the aerofoil during the welding process, which can create stress raisers. When the projection is a close fit to the cavity, the risk of voids forming in the weld can be reduced. The risk of voids forming in the weld can be further reduced by provision of increased wall thickness in the region of the weld. The radius applied to the leading edge and trailing edge of the cavity can reduce the risk of voids forming in the weld between the aerofoil and the stub.

The above method has been described in relation to OGVs, but it may also be applied to other vane types.

In the present example, the stubs are provided on a ring that is defined by a single annulus member, but in alternative embodiments the ring may be defined by a plurality of arcuate members.

In the present example the aerofoil is manufactured using diffusion bonding and hot creep forming, but in alternative embodiments the aerofoil may be made using any other known manufacturing methods. In further alternative embodiments, an aerofoil and support member with a hollow cavity that extends through the support member to the aerofoil may be manufactured without the need to weld the aerofoil to the support member, for example using additive layer manufacturing techniques.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of manufacturing a vane arrangement for a gas turbine engine, the method comprising:
providing an aerofoil having a hollow cavity with an open end;
providing a support member having a stub wherein the stub is hollow with a cover extending across and fully enclosing a radially outer end of the stub;
welding the open end of the aerofoil to the radially outer end of the stub; and
removing at least a portion of the cover so as to define a hollow region that extends through the support member and stub to the cavity of the aerofoil.

2. The method according to claim 1, wherein the cover includes a protrusion that is received in the cavity of the aerofoil for locating the aerofoil relative to the stub.

3. The method according to claim 2, wherein the protrusion has a perimeter that is fitted within a leading edge and/or trailing edge cavity of the aerofoil.

4. The method according to claim 2, wherein the protrusion is waisted so as to reduce a volume of material at a position distal from the weld formed between the stub and aerofoil.

5. The method according to claim 1 comprising removing material from the cavity of the aerofoil to define a radius greater than or equal to 3 mm at a leading edge and/or trailing edge of the cavity at a position adjacent to the open end of the cavity.

6. The method according to claim 1 comprising forming a radius greater than or equal to 3 mm at a leading edge and/or trailing edge of the hollow portion of the stub at a position proximal to the aerofoil.

7. The method according to claim 1, wherein walls of the aerofoil are thicker in a region proximal to the open end than a region distal to the open end of the cavity.

8. The method according to claim 1 comprising providing the aerofoil with an enclosed cavity and removing one end of the aerofoil to expose the cavity and define the open end of the cavity.

9. The method according to claim 8 comprising forming the aerofoil with the enclosed cavity using diffusion bonding and hot creep forming.

10. The method according to claim 1, wherein the support member is a ring, and wherein, optionally, the stub of the ring is welded to a radially inner end of the aerofoil.

11. The method according to claim 10, comprising providing a support foot having a stub, welding a radially outer end of the aerofoil to the stub of the foot; and removing material from the stub of the foot so as to define a hollow region that extends through the foot and stub to the aerofoil cavity.

12. The method according to claim 1, wherein the support member is a support foot.

13. The method according to claim 1, wherein the vane arrangement is a fan outlet guide vane arrangement.

14. A method of manufacturing a vane arrangement for a gas turbine engine, the method comprising:
providing a plurality of aerofoils each having a hollow cavity with an open end;
providing a support member having a plurality of stubs wherein each stub is hollow with a cover extending across and fully enclosing a radially outer end of the stub;
welding the open end of each aerofoil to the radially outer end of each stub; and
removing at least a portion of each cover so as to define hollow regions that extend through the support member and each stub to the cavity of each aerofoil.

15. A method of manufacturing a gas turbine engine comprising the method according to claim 1.

* * * * *